Jan. 21, 1936. J. LAVERGNE 2,028,675
EXPANSION VALVE FOR STEAM
Filed Aug. 25, 1934
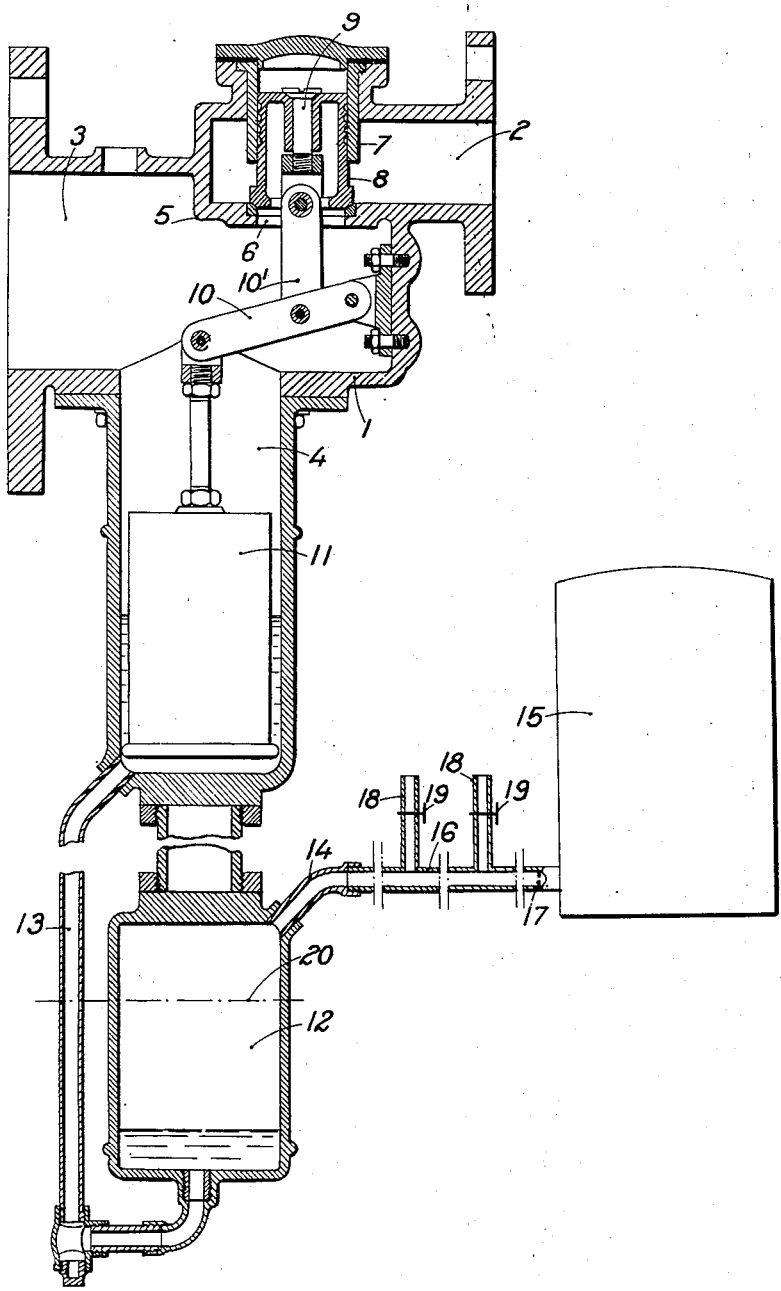
J. Lavergne
INVENTOR
By Marks & Clerk
Attys.

Patented Jan. 21, 1936

2,028,675

UNITED STATES PATENT OFFICE 2,028,675

EXPANSION VALVE FOR STEAM

Jean Lavergne, Paris, France, assignor to Society Compagnie de Chauffage Central par le Vide, Neuilly-sur-Seine, Seine, France, a corporation of France Application August 25, 1934, Serial No. 741,466
In France September 27, 1933

1 Claim. (Cl. 50—12)

The present invention relates to an apparatus for the expansion of steam, from a pressure above atmospheric pressure, to a pressure below the same, the final pressure being variable and depending upon manual or automatic control, for instance by a thermostat. The said apparatus is chiefly adapted for use in steam-heating plants with variable vacuum.

The steam-heating plants employing a vacuum comprise expansion apparatus interposed between a high-pressure steam pipe connected with the boiler, and a low-pressure steam pipe connected with the piping of the heating plant. In order to regulate the pressure in the low-pressure pipe, each valve of the expansion apparatus is usually controlled by a float which is mounted in one of the parts of a manometer of the liquid type. If the pressure in the other part is constant, the vacuum produced in the low-pressure pipe will effect a constant lowering of the liquid in the manometer, thus producing a displacement of the float corresponding to the admission of a quantity of steam equal to the supply of steam circulating in the heating plant.

In the case of heating with the use of a variable vacuum, to which the present invention is applicable, such heating may be effected at absolute pressures between 0.200 and 1.300 kgs. In conformity with the invention, the variable pressure is obtained by the use of an air tank under pressure, which is connected with the second part of the manometric system by means of a diaphragm, and the communicating piping comprises branches providing for the evacuation of air through cocks controlled by hand or automatically, for instance by thermostats.

The accompanying drawing shows by way of example an embodiment of the invention.

The figure represents a section showing the expansion device, the manometric system acting upon the float, and the air tank connected with the manometric system.

The apparatus consists of a main body 1 provided with a neck 2 for the admission of steam at high pressure and with a neck 3 for the discharge of expanded steam. This main body 1 is assembled with a recipient 4, forming the first part of a manometric device containing liquid. In the interior of the body 1 is located a partition 5 separating the necks 2 and 3, and said partition is pierced with an aperture 6 above which is located a cylinder 7 in which is movable a piston 8 forming a valve and adapted to close the aperture 6. The valve 8 is operated by a rod 10¹ secured to a small auxiliary valve 9 and actuated by the amplifying lever 10, at whose end is suspended a float 11 located in the recipient 4.

A second recipient 12, situated at lower level than the recipient 4, is connected with the latter by a pipe 13, and forms the second part of the manometric device containing liquid. A neck 14 connected with the recipient 12 is connected by a pipe 16 with a central tank 15 containing air which is compressed at a constant pressure. A diaphragm 17 is mounted at the outlet of the compressed air tank, and the branch pipes 18, mounted along the pipe 16, are each provided with a closing cock 19. One of the branch pipes 18 is provided at its end with a hand-operated cock which serves to evacuate a greater or less amount of the air contained in the system, and thus to regulate the pressure prevailing in the latter. The other branch is provided with a thermostat serving to automatically regulate a small discharge of air, thus regulating the pressure in the tank 12. This affords either a central regulating by hand, by operating one of the closing cocks 19, or an automatic central regulating by thermostat. It is further possible to eliminate the effect of the regulating by hand and by thermostat, and to act directly upon the pressure of the air tank, which is usually mounted in the room containing the boilers.

In the first place, the recipient 12 is filled with mercury up to the necessary level 20. The neck 3, for the expanded steam, is connected with the system of steam heating in a vacuum, and the neck 2 is connected with a central supply of steam at any pressure. The pressure in the air tank 15 should be sufficient to raise the mercury and to bring it to the float, in order to obtain the maximum absolute effective pressure. This pressure in the tank 15 is reduced through the diaphragm, it being exerted to the maximum in the pipe 16 when the cocks 19 are closed; the opening of one of the cocks 19 permits to obtain all variations of the effective pressure, by more or less opening one of the regulating needle-valves, either the one which is operated by hand, or the one controlled by thermostat.

The level of the mercury in the two recipients when the float is raised, should be determined for the minimum absolute effective pressure, this being obtained when the air pressure has a zero value by reason of the entire opening of the regulating system in use, whether under manual or thermostatic control.

A single air tank may be employed for the control of a certain number of expansion devices, which may be located in different buildings and at any distance apart.

It is feasible to vary the temperature of the steam for each building or set of rooms, by the use of an expansion device having a different height of mercury, or a special tank at a different pressure for the similar expansion devices.

It is further possible to employ any other fluid than air, such as water, using a suitable diaphragm, cocks and thermostat.

I claim:

An expansion device for obtaining a fluid under a variable vacuum, applicable to steam heating plants with variable vacuum comprising two branches of a manometer of the liquid type, a float arranged in the upper branch, a steam chamber communicating with said upper branch, a regulating ventil in said chamber connected with said float, a fluid tank under constant pressure communicating by a reduced aperture and a conduit with the lower branch, and cocks connected with said conduit for regulating the pressure of the lower branch.

JEAN LAVERGNE.